United States Patent
Arakawa

(10) Patent No.: US 10,824,147 B2
(45) Date of Patent: Nov. 3, 2020

(54) AUTONOMOUS DRIVING VEHICLE AND CONTROL METHOD FOR AUTONOMOUS DRIVING VEHICLE

(71) Applicant: TOYOTA JIDOSHA KABUSHIKI KAISHA, Toyota-shi (JP)

(72) Inventor: Seiji Arakawa, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/050,877

(22) Filed: Jul. 31, 2018

(65) Prior Publication Data
US 2019/0079518 A1 Mar. 14, 2019

(30) Foreign Application Priority Data
Sep. 14, 2017 (JP) ................. 2017-176996

(51) Int. Cl.
| | |
|---|---|
| *G01C 22/00* | (2006.01) |
| *G05D 1/00* | (2006.01) |
| *B60W 50/00* | (2006.01) |
| *G05D 1/02* | (2020.01) |
| *B60R 21/34* | (2011.01) |
| *B60N 2/00* | (2006.01) |
| *B60W 30/095* | (2012.01) |

(52) U.S. Cl.
CPC ....... *G05D 1/0088* (2013.01); *B60W 50/0097* (2013.01); *G05D 1/0055* (2013.01); *G05D 1/0246* (2013.01); *B60N 2/002* (2013.01); *B60R 21/34* (2013.01); *B60W 30/095* (2013.01); *G05D 1/0223* (2013.01); *G05D 2201/0212* (2013.01)

(58) Field of Classification Search
CPC .. G05D 1/0088; G05D 1/0055; G05D 1/0246; G05D 1/0061; G05D 1/0202; G05D 1/0212; B60W 50/0097
USPC ........................................................ 701/23
See application file for complete search history.

(56) References Cited

U.S. PATENT DOCUMENTS

| | | |
|---|---|---|
| 2017/0123423 A1 | 5/2017 | Sako et al. |
| 2019/0039606 A1 | 2/2019 | Fujita et al. |
| 2019/0064806 A1* | 2/2019 | Nix ...................... G05D 1/0061 |

FOREIGN PATENT DOCUMENTS

| | | |
|---|---|---|
| JP | 2016-13730 A | 1/2016 |
| JP | 2017-059254 A | 3/2017 |
| JP | 2017-140890 A | 8/2017 |

* cited by examiner

*Primary Examiner* — Mahmoud S Ismail
(74) *Attorney, Agent, or Firm* — Sughrue Mion, PLLC

(57) ABSTRACT

An autonomous driving vehicle includes a user detection monitoring device and a start control device. The user detection monitoring device detects a user who got out of the autonomous driving vehicle after the autonomous driving vehicle stopped at a destination as an alighted user and monitors the alighted user. The start control device maintains a stopped state of the autonomous driving vehicle after the alighted user was detected until a start condition is satisfied and, if the start condition is satisfied, permits a start of the autonomous driving vehicle. The start condition is one of a condition indicating that the alighted user at least moves out of a movement determination area around the autonomous driving vehicle and a condition indicating that the alighted user is present in the movement determination area but remains at the same position for a certain period of time or longer.

5 Claims, 6 Drawing Sheets

AUTONOMOUS DRIVING VEHICLE AND CONTROL METHOD FOR AUTONOMOUS DRIVING VEHICLE

INCORPORATION BY REFERENCE

The disclosure of Japanese Patent Application No. 2017-176996 filed on Sep. 14, 2017 including the specification, drawings and abstract is incorporated herein by reference in its entirety.

BACKGROUND

1. Technical Field

The present disclosure relates to an autonomous driving vehicle for providing the driverless transportation service and a control method for the autonomous driving vehicle.

2. Description of Related Art

Recently, there is provided a driverless transportation service in which autonomous driving vehicles capable of unmanned driving are used. In this driverless transportation service, an autonomous driving vehicle picks up a user and autonomously travels toward a destination desired by the user. When the autonomous driving vehicle arrives at the destination and stops there, the user gets out of the autonomous driving vehicle.

Japanese Patent Application Publication No. 2017-059254 (JP 2017-059254 A) discloses a technique that allows the user who gets out of an autonomous driving vehicle to give an instruction about the behavior of the autonomous driving vehicle that will be performed after the user gets out of it. For example, to the autonomous driving vehicle from which the user got off, the user can give an instruction to wait on the spot or to travel to a specified location.

SUMMARY

A user who got out of an autonomous driving vehicle will behave according to his or her schedule or intention. Therefore, it is difficult for the autonomous driving vehicle to predict the movement of the user who got out of the autonomous driving vehicle. For example, for a pedestrian on the sidewalk, it may be possible for the autonomous driving vehicle to detect the pedestrian using a sensor and, based on the trajectory, to predict the future movement of the pedestrian. However, for a user who has just got out of the autonomous driving vehicle, there is no such trajectory data and, therefore, it is impossible to predict the movement of the user based on the past trajectory.

As described above, it is difficult to predict how a user, who got out of an autonomous driving vehicle, will move. This means that, if the autonomous driving vehicle casually starts moving after the user got out of the autonomous driving vehicle, there is a danger of accidental contact with the user who got out of the vehicle.

The present disclosure increases the safety of a user who got out of an autonomous driving vehicle in the driverless transportation service where autonomous driving vehicles are used.

A first aspect of the present disclosure is an autonomous driving vehicle that provides the driverless transportation service to a user. The autonomous driving vehicle includes a user detection monitoring device configured to detect the user who got out of the autonomous driving vehicle after the autonomous driving vehicle stopped at a destination as an alighted user and configured to monitor the alighted user and a start control device configured to maintain a stopped state of the autonomous driving vehicle after the alighted user was detected until a start condition is satisfied and configured to permit a start of the autonomous driving vehicle when the start condition is satisfied. The start condition is one of a condition indicating that the alighted user at least moves out of a movement determination area around the autonomous driving vehicle and a condition indicating that the alighted user is present in the movement determination area but remains at the same position for a certain period of time or longer.

With the configuration described above, the autonomous driving vehicle will not start moving unconditionally after the user gets out of the autonomous driving vehicle. To reduce contact with the alighted user, the start condition that takes into consideration the position and movement of the alighted user is applied to the start of the autonomous driving vehicle. Until the start condition is satisfied, the start is prohibited and the autonomous driving vehicle maintains the stopped state. When the start condition is satisfied, the start of the autonomous driving vehicle is permitted. Controlling the start of the autonomous driving vehicle in this way improves the safety of the alighted user.

In the autonomous driving vehicle described above, the user detection monitoring device may be configured to detect a target around the autonomous driving vehicle using a sensor. When the user detection monitoring device detects a new target in an alighting determination area adjacent to the autonomous driving vehicle after the autonomous driving vehicle stopped at the destination, the user detection monitoring device may be configured to recognize the new target as the alighted user and may be configured to monitor the new target as the alighted user.

With the configuration described above, When a new target is detected in an alighting determination area adjacent to the autonomous driving vehicle after the autonomous driving vehicle stopped at the destination, the new target is recognized as the alighted user. Thus, the alighted user can be detected accurately.

In the autonomous driving vehicle described above, the user detection monitoring device may be configured to detect at least one of an alighting action and information suggesting the alighting action and may be configured to recognize the new target that is detected in conjunction with the alighting action as the alighted user. The alighting action may be an action of the user when the user gets out of the autonomous driving vehicle.

With the configuration described above, the alighting action is also used to recognize the alighted user, and a new target detected in conjunction with the alighting action is recognized as the alighted user. Thus, the detection accuracy of the alighted user is further increased.

A second aspect of the present disclosure is a control method for an autonomous driving vehicle. The autonomous driving vehicle includes a user detection monitoring device and a start control device. The control method includes detecting, by the user detection monitoring device, a user who got out of the autonomous driving vehicle after the autonomous driving vehicle stopped at a destination as an alighted user; monitoring, by the user detection monitoring device, the alighted user; maintaining, by the start control device, a stopped state of the autonomous driving vehicle after the alighted user was detected until a start condition is satisfied; and permitting, by the start control device, a start of the autonomous driving vehicle when the start condition is satisfied. The start condition is one of a condition indicating that the alighted user at least moves out of a movement determination area around the autonomous driving vehicle and a condition indicating that the alighted user is present in the movement determination area but remains at the same position for a certain period of time or longer.

With the configuration described above, the autonomous driving vehicle will not start moving unconditionally after the user gets out of the autonomous driving vehicle. To reduce contact with the alighted user, the start condition that takes into consideration the position and movement of the alighted user is applied to the start of the autonomous driving vehicle. Until the start condition is satisfied, the start is prohibited and the autonomous driving vehicle maintains the stopped state. When the start condition is satisfied, the start of the autonomous driving vehicle is permitted. Controlling the start of the autonomous driving vehicle in this way improves the safety of the alighted user.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure will be described in detail below with reference to the drawings.

This embodiment relates to the driverless transportation service in which autonomous driving vehicles capable of unmanned driving are used. The basic flow of the driverless transportation service is as follows.

First, a user uses a user terminal (for example, a smartphone) to send a dispatch request to the management center. The dispatch request includes a user-desired pickup position and other related information. The dispatch request is sent to the management server of the management center over a communication network. The management server selects an autonomous driving vehicle that will provide the service to the user and sends the information on the dispatch request to the selected autonomous driving vehicle. When the information is received, the autonomous driving vehicle travels autonomously to the pickup position.

The autonomous driving vehicle arrives at the pickup position and stops there. The user gets in the autonomous driving vehicle. The user gives the information about the destination (position where the user will get out of the vehicle) to the autonomous driving vehicle. The information about the destination need may also be included in the dispatch request. The autonomous driving vehicle travels autonomously towards the destination. The autonomous driving vehicle arrives at the destination and stops there. The user gets out of the autonomous driving vehicle.

Figure 1:
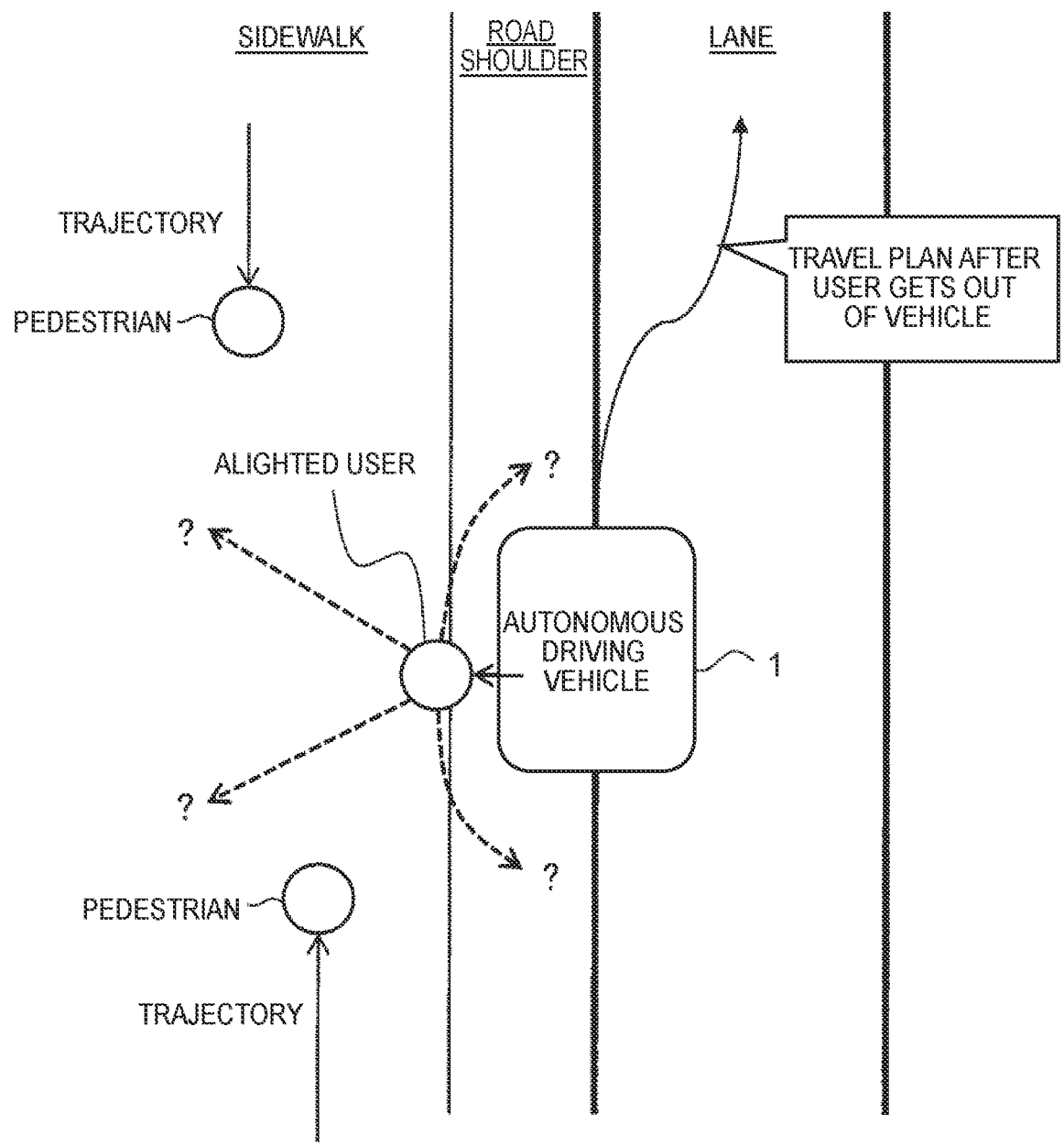
FIG. 1 is a conceptual diagram showing a problem that may arise when the user gets out of an autonomous driving vehicle in the driverless transportation service.

FIG. 1 is a conceptual diagram showing a problem that may arise when the user gets out of an autonomous driving vehicle in the driverless transportation service. An autonomous driving vehicle 1 capable of unmanned driving arrives at the destination (where the user gets out of the vehicle) and stops there. The user gets out of the autonomous driving vehicle 1. In the description below, the user who has gotten out of the autonomous driving vehicle 1 is referred to as an "alighted user".

An alighted user behaves according to his or her own schedule and intention. Therefore, it is difficult for the autonomous driving vehicle 1 to predict the movement of the alighted user. For example, for a pedestrian on the sidewalk, it may be possible for the autonomous driving vehicle 1 to detect the pedestrian using a sensor and, based on the trajectory, to predict the future movement of the pedestrian. However, for an alighted user who has just got out of the autonomous driving vehicle 1, there is no such trajectory data and, therefore, it is impossible to predict the movement of the user based on the past trajectory.

As described above, it is difficult to predict how the alighted user will move. On the other hand, after the user got out of the vehicle, the autonomous driving vehicle 1 starts traveling according to the next travel plan. At this time, if the autonomous driving vehicle 1 casually starts moving, there is a danger of accidental contact with the alighted user.

To address this problem, this embodiment defines a "start condition" for permitting the start of the autonomous driving vehicle 1 after the user gets out of the vehicle. According to this condition, the start of the autonomous driving vehicle 1 is prohibited until the start condition is satisfied and the autonomous driving vehicle 1 maintains the stopped state. When the start condition is satisfied, the start of the autonomous driving vehicle 1 is permitted. In the description below, such processing is referred to as "start condition confirmation processing".

Figure 2:
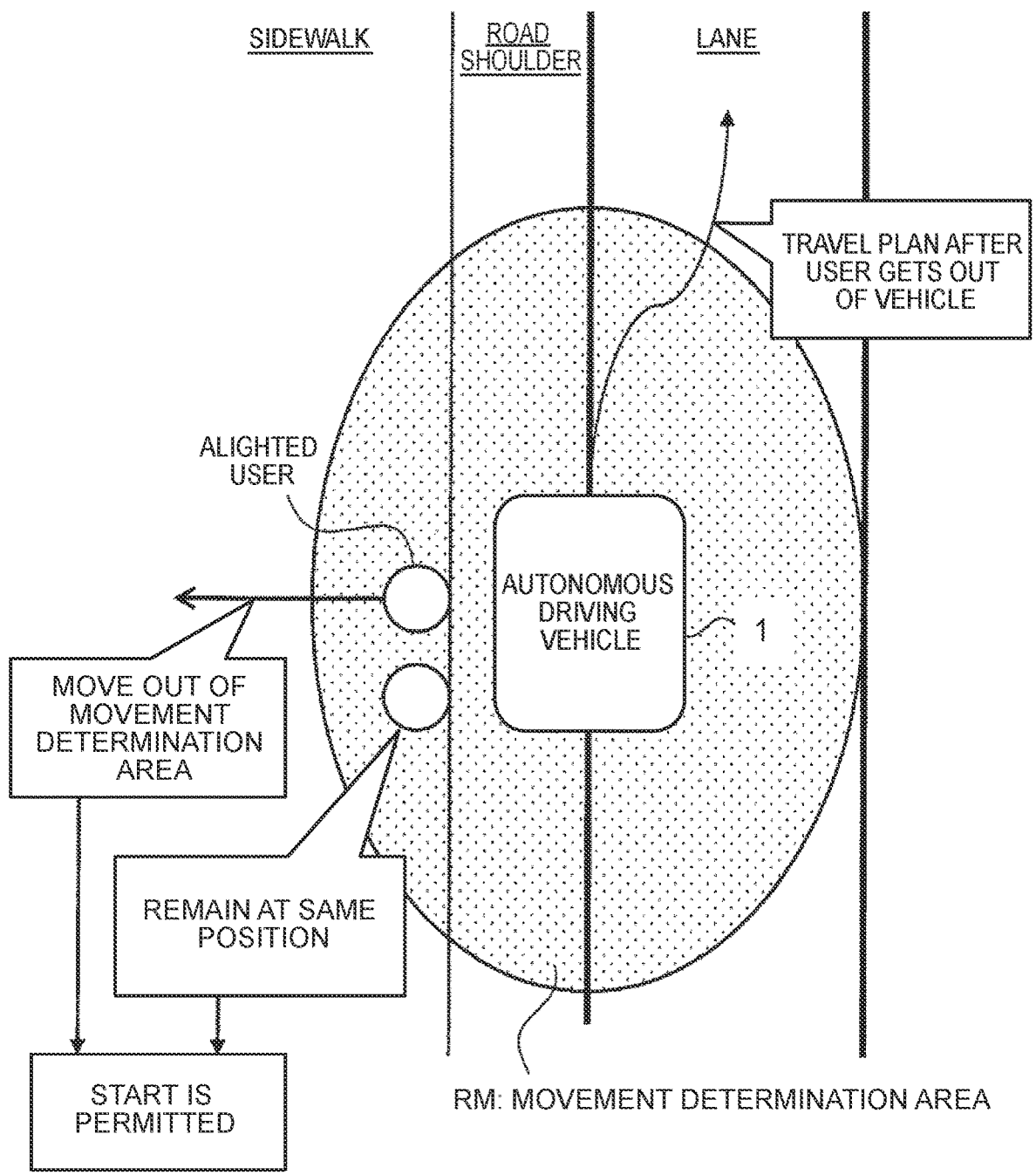
FIG. 2 is a conceptual diagram showing the start condition confirmation processing performed by an autonomous driving vehicle according to an embodiment of the present disclosure.

FIG. 2 is a conceptual diagram showing the start condition confirmation processing performed by the autonomous driving vehicle 1 in this embodiment. Once the alighted user gets away from the autonomous driving vehicle 1 to some extent, it is considered that the autonomous driving vehicle 1, if started, will not contact the alighted user. Taking this into consideration, the "movement determination area RM" is defined. The movement determination area RM is used to determine whether the alighted user is away to some extent from the autonomous driving vehicle 1. The movement determination area RM is an area around the autonomous driving vehicle 1. For example, the movement determination area RM is defined as a range within a certain distance from the autonomous driving vehicle 1. The movement determination area RM may also be defined such that the width along the traveling direction of the autonomous driving vehicle 1 is larger than the width along the lateral direction of the autonomous driving vehicle 1.

If the alighted user is present in the movement determination area RM, the start of the autonomous driving vehicle 1 is prohibited for safety. If the alighted user moves out of the movement determination area RM, the start of the autonomous driving vehicle 1 is permitted. Alternatively, if the alighted user moves out of the movement determination area RM and if a certain period of time has elapsed since the user got out of the vehicle, the start of the autonomous driving vehicle 1 may be permitted. That is, the start condition is that "the alighted user at least moves out of the movement determination area RM". In the description below, this start condition is referred to as a "first start condition".

If, after getting out of the autonomous driving vehicle 1, the user does not move for a moment and stops at the same position, the autonomous driving vehicle 1, if started, is less likely to contact the alighted user. Therefore, if the alighted user is present in the movement determination area RM but if the alighted user has not an intention to move, the start of the autonomous driving vehicle 1 is permitted.

Whether or not the alighted user has an intention to move is determined based on the position of the alighted user. If the alighted user remains at the same position for a certain period of time or longer, it is determined that the alighted user does not have an intention to move. That is, in this case, the start condition is that "the alighted user is present in the movement determination area RM but remains at the same position for a certain period of time or longer". In the description below, this start condition is called a "second start condition". Note that, when the second start condition is satisfied, a start that is more gradual than that when the first start condition is satisfied may be set.

The start condition in this the embodiment is the first start condition or the second start condition. That is, the start is prohibited until the first start condition or the second start condition is satisfied and, while the start is prohibited, the autonomous driving vehicle 1 maintains the stopped state. When the first start condition or the second start condition is satisfied, the start of the autonomous driving vehicle 1 is permitted.

Figure 3:
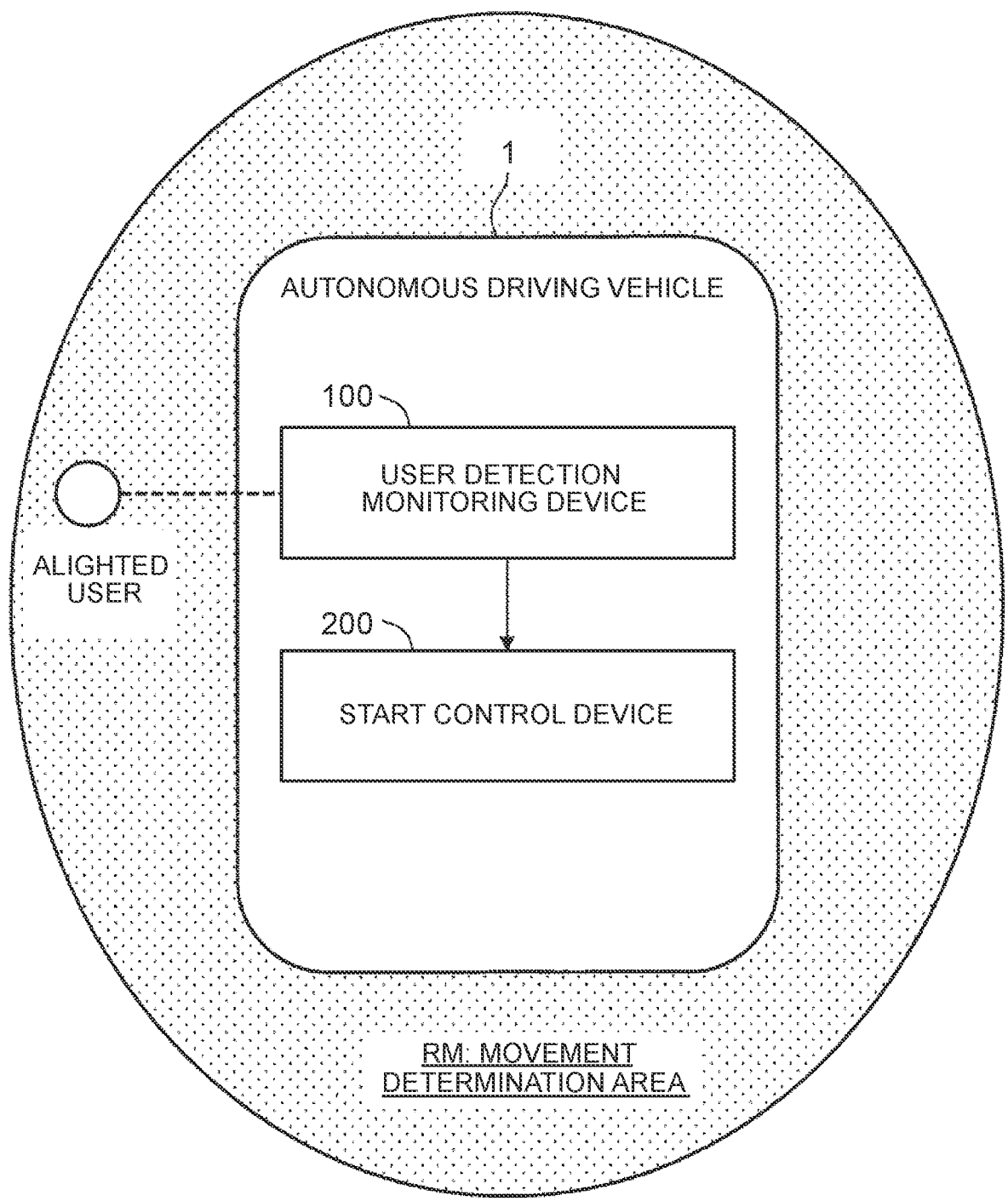
FIG. 3 is a block diagram schematically showing a configuration of an autonomous driving vehicle according to an embodiment of the present disclosure.

FIG. 3 is a block diagram schematically showing a configuration of the autonomous driving vehicle 1 according to this embodiment. The autonomous driving vehicle 1 includes a user detection monitoring device 100 and a start control device 200. After the autonomous driving vehicle 1 stops at the destination, the user detection monitoring device 100 detects the user who got out of the autonomous driving vehicle 1 as an alighted user and monitors the detected alighted user. After the alighted user is detected and until the start condition described above is satisfied, the start control device 200 prohibits the start and maintains the stopped state of the autonomous driving vehicle 1. When the start condition is satisfied, the start control device 200 permits the start of the autonomous driving vehicle 1.

As described above, the autonomous driving vehicle 1 will not start moving unconditionally in this embodiment after the user gets out of the autonomous driving vehicle 1. To reduce contact with the alighted user, the start condition that takes into consideration the position and movement of the alighted user is applied to the start of the autonomous driving vehicle 1. Until the start condition is satisfied, the start is prohibited and the autonomous driving vehicle 1 maintains the stopped state. When the start condition is satisfied, the start of the autonomous driving vehicle 1 is permitted. Controlling the start of the autonomous driving vehicle 1 in this way improves the safety of the alighted user.

An example of the configuration of the autonomous driving vehicle 1 according to this embodiment, as well as its processing, will be described in detail.

Figure 4:
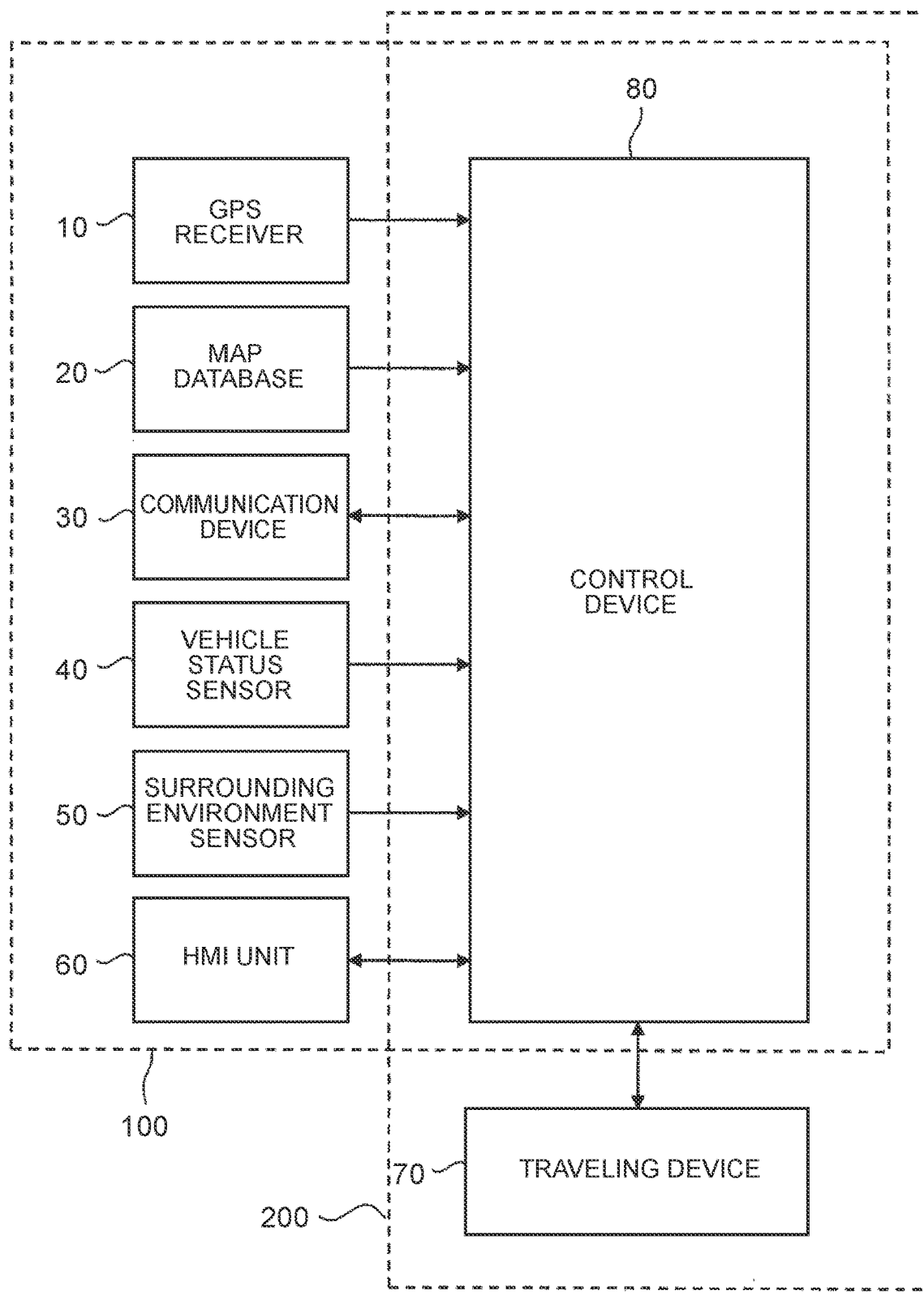
FIG. 4 is a block diagram showing an example of the configuration of an autonomous driving vehicle according to an embodiment of the present disclosure.

FIG. 4 is a block diagram showing an example of the configuration of the autonomous driving vehicle 1 according to this embodiment. The autonomous driving vehicle 1, capable of unmanned driving, provides driverless transport service to users. In the example shown in FIG. 4, the autonomous driving vehicle 1 includes a Global Positioning System (GPS) receiver 10, a map database 20, a communication device 30, a vehicle status sensor 40, a surrounding environment sensor 50, a Human Machine Interface (HMI) unit 60, a traveling device 70, and a control device 80.

The GPS receiver 10 receives signals sent from a plurality of GPS satellites and calculates the position and direction (orientation) of the autonomous driving vehicle 1 based on the received signals. The GPS receiver 10 sends the position and direction information to the control device 80.

The map database 20 records therein the map information. The map database 20 is stored in a predetermined storage device. The control device 80 can acquire the map information around the autonomous driving vehicle 1 from the map database 20 based on the position and direction information described above.

The communication device 30 communicates with the management server in the management center via a communication network. In addition, the communication device 30 communicates with the user terminal of a user via a communication network.

The vehicle status sensor 40 detects various states of the autonomous driving vehicle 1. Examples of the vehicle status sensor 40 include a vehicle speed sensor, a shift position sensor, a door open/close sensor, a seating sensor, a weight sensor, and an indoor camera. The vehicle speed sensor detects the speed (vehicle speed) of the autonomous driving vehicle 1. The shift position sensor detects the shift position. The door open/close sensor detects the opening and closing of the door. The seating sensor detects that the user is sitting on the seat. The weight sensor detects the total weight of the autonomous driving vehicle 1. The indoor camera captures the indoor situation of the autonomous driving vehicle 1.

The surrounding environment sensor 50 detects the environment (situation) around the autonomous driving vehicle 1. Examples of surrounding environment sensors include a camera, Laser Imaging Detection and Ranging (LIDAR), a millimeter wave radar, and a clearance sonar. Using the surrounding environment sensor 50, a target around the autonomous driving vehicle 1 can be detected. In particular, the surrounding environment sensor 50 is used in this embodiment for detecting and monitoring an alighted user. The surrounding environment sensor 50 may include a dedicated sensor for detecting and monitoring an alighted user.

The HMI unit 60 is an interface for notifying the user about the information and for accepting the information from the user. For example, the HMI unit 60 includes a display device, a speaker, an input device, and a microphone. The HMI unit 60 can notify various types of information to the user through the display device and the speaker. Examples of the input device include a touch panel, a switch, and a button. The user can input various types of information to the HMI unit 60 using the input device or the microphone.

The traveling device 70 includes a steering device, a driving device, and a braking device. The steering device steers the wheels. The driving device is a power source for generating the driving force. Examples of the driving device include an electric motor and an engine. The braking device generates a braking force.

The control device 80 controls the driverless transportation service performed by the autonomous driving vehicle 1. In particular, the control device 80 performs the start condition confirmation processing described above. For example, the control device 80 uses the surrounding environment sensor 50 to detect an alighted user and monitor the detected alighted user. The control device 80 also determines whether the start condition is satisfied. In addition, the control device 80 controls the traveling device 70 in such a way that the start and traveling of the autonomous driving vehicle 1 is controlled. Typically, the control device 80 is a microcomputer including a processor, a memory, and an input/output interface. The control device 80 is also called an Electronic Control Unit (ECU).

The user detection monitoring device 100 described above includes the GPS receiver 10, the map database 20, the communication device 30, the vehicle status sensor 40, the surrounding environment sensor 50, the HMI unit 60, and the control device 80. The start control device 200 described above includes the traveling device 70 and the control device 80.

Figure 5:
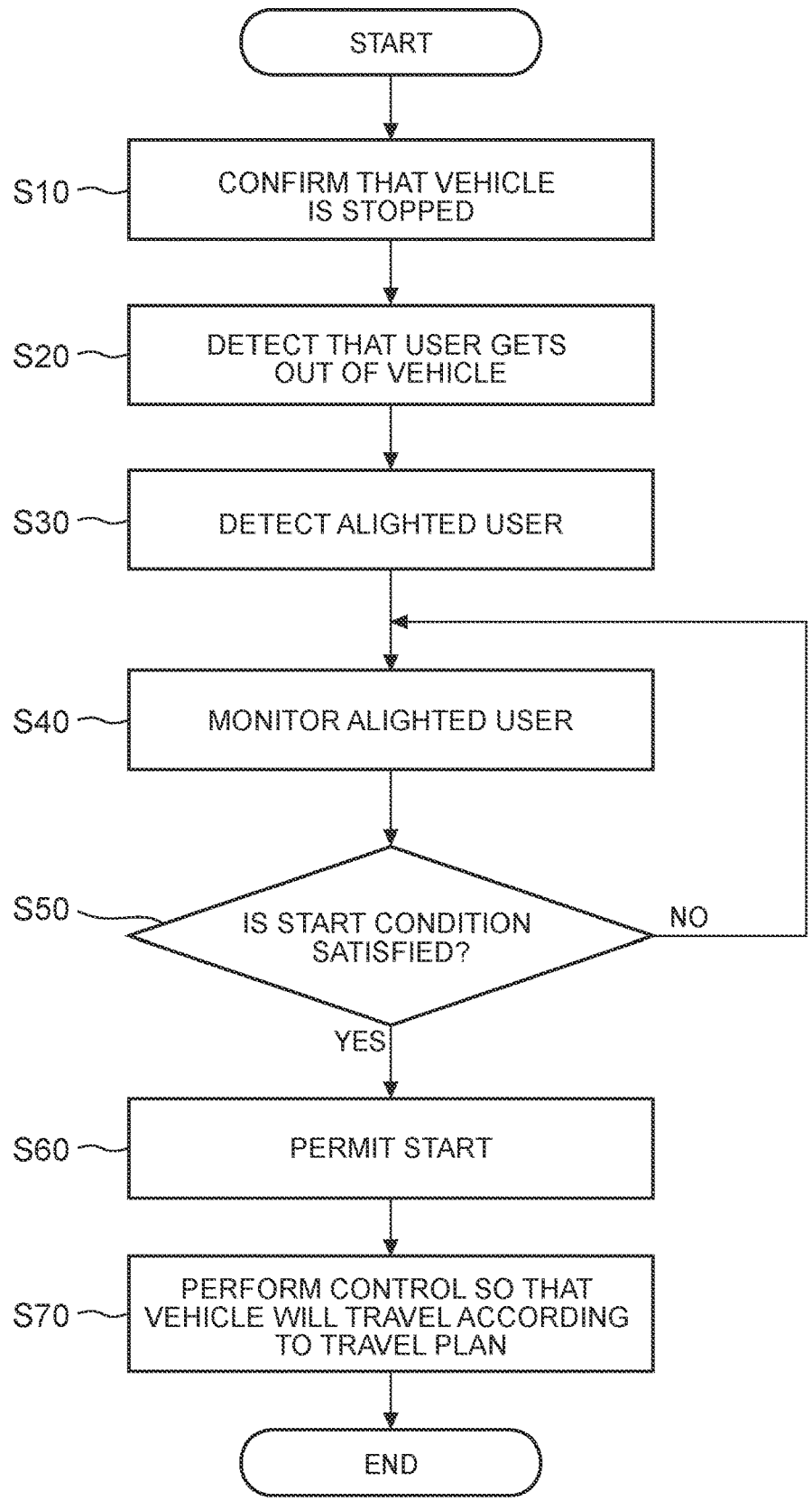
FIG. 5 is a flowchart showing the processing performed by a control device of an autonomous driving vehicle according to an embodiment of the present disclosure.

FIG. 5 is a flowchart showing the processing performed by the control device 80 of the autonomous driving vehicle 1 according to this embodiment.

After the autonomous driving vehicle 1 arrives at the destination, the control device 80 first confirms that the autonomous driving vehicle 1 is stopped (step S10). For example, the control device 80 confirms that the vehicle speed, detected by the vehicle speed sensor included in the vehicle status sensor 40, is zero. Also, the control device 80 may confirm that the shift position, detected by the shift position sensor included in the vehicle status sensor 40, is "P (parking)". If it is confirmed that the autonomous driving vehicle 1 is stopped, the processing proceeds to the next step S20.

When the autonomous driving vehicle 1 stops at the destination, the user gets out of the autonomous driving vehicle 1 (step S20). In the description below, the action taken by the user when he or she gets out of the autonomous driving vehicle 1 is referred to as an "alighting action". The control device 80 detects the alighting action or the information suggesting the alighting action.

The information that suggests the alighting action includes the following. For example, the opening of the door after the autonomous driving vehicle 1 stopped suggests the alighting action. Similarly, the user action that the user stands up from the seat after the autonomous driving vehicle 1 stopped suggests the alighting action. Similarly, a decrease in its total weight after the autonomous driving vehicle 1 stopped suggests the alighting action. These information can be detected, respectively, by the door open/close sensor, the seating sensor, and the weight sensor all of which are included in the vehicle status sensor 40.

In another example, the alighting action can be detected by capturing the indoor situation of the autonomous driving vehicle 1 using the indoor camera included in the vehicle status sensor 40 and then by analyzing the captured data by the control device 80.

In still another example, moving the position of the user terminal, carried by the user, from the interior to the exterior the autonomous driving vehicle 1 means that the user gets out of the vehicle. Therefore, the control device 80 can also detect the alighting action by comparing the position of the user terminal and the position of the autonomous driving vehicle 1. The position of the user terminal is estimated by the user terminal. The control device 80 acquires the position information from the user terminal via the communication device 30. The position of the autonomous driving vehicle 1 is obtained by the GPS receiver 10. Alternatively, the position of the autonomous driving vehicle 1 may be calculated by the localization processing. The localization processing is performed in such a way that a landmark target (monument, signboard, roadside structure, white line, etc.), registered in the map information in advance, and a landmark target, actually detected by the surrounding environment sensor 50, are compared to accurately calculate the position of the autonomous driving vehicle 1.

In still another example, when getting out of the autonomous driving vehicle 1, the user informs the autonomous driving vehicle 1 that he or she will get out of the vehicle. For example, the user sends the getting-off information using the user terminal. The control device 80 receives the getting-off information via the communication device 30. Alternatively, the user presses the getting-off button that is included in the HMI unit 60. The control device 80 receives the information, indicating that the getting-off button has been pressed, from the HMI unit 60.

The control device 80 performs step S30 described below after, or in parallel with, step S20.

The control device 80 detects the alighted user (step S30). For example, the control device 80 uses the surrounding environment sensor 50 to detect the alighted user.

Figure 6:
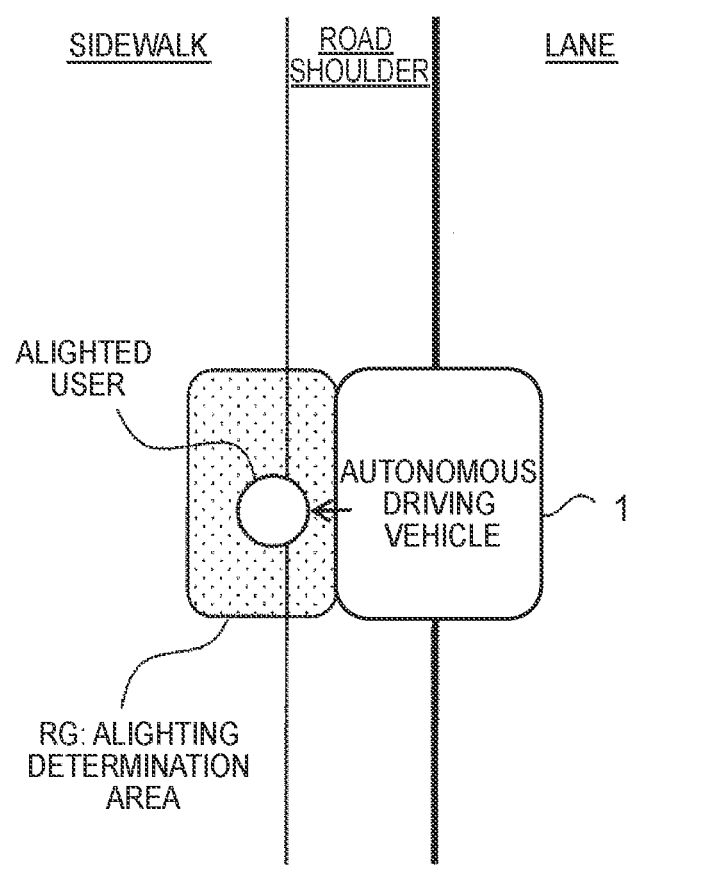
FIG. 6 is a conceptual diagram showing an example of the alighted user detection processing (step S30) according to an embodiment of the present disclosure.

FIG. 6 is a conceptual diagram showing the alighted user detection processing in which the surrounding environment sensor 50 is used. The "alighting determination area RG" shown in FIG. 6 is an area adjacent to the autonomous driving vehicle 1 and is an area to which the user is assumed to move from the interior of the autonomous driving vehicle 1. Typically, the direction in which the user is supposed to move from the interior of the vehicle is the direction of the door that was opened. Which door was opened can be detected by the door open/close sensor included in the vehicle status sensor 40. Note that the alighting determination area RG is smaller than the movement determination area RM shown in FIG. 2.

The control device 80 can detect the relative position of a target around the autonomous driving vehicle 1 using the surrounding environment sensor 50. If a "new target" is detected in the alighting determination area RG after the autonomous driving vehicle 1 stopped, it is highly likely that the new target is the alighted user. Therefore, the control device 80 recognizes the new target as the alighted user.

In detecting the alighted user, the alighting action detected in step S20 described above may be taken into consideration. It is considered that the alighted user is detected after, or in conjunction with, the alighting action. Therefore, the "new target" detected in conjunction with the alighting action is highly likely to be the alighted user. For this reason, the control device 80 recognizes the new target, detected in conjunction with the alighting action, as the alighted user. This further improves the accuracy of the alighted user detection processing.

In another example of the alighted user detection processing, the position of the user terminal may be regarded as the position of the alighted user. In other words, when the user terminal is detected in the alighting determination area RG after the autonomous driving vehicle 1 stopped, the control device 80 recognizes the user terminal as the alighted user. As described above, the position information on the user terminal can be acquired from the user terminal via the communication device 30. Also, the position of the autonomous driving vehicle 1 can be obtained by the GPS receiver 10 or by the localization processing. The alighting determination area RG adjacent to the autonomous driving vehicle 1 is obtained from the position of the autonomous driving vehicle 1. In this example, too, the alighting action detected in step S20 may be taken into consideration.

Following step S30, the control device 80 monitors the alighted user detected in step S30. In particular, the control device 80 monitors the relative position of the alighted user with respect to the autonomous driving vehicle 1.

The control device 80 determines whether the start condition is satisfied based on the monitoring result obtained in step S40 (step S50). As described above, the start condition is the first start condition or the second start condition. The first start condition is that "the alighted user at least moves out of the movement determination area RM". The second start condition is that "the alighted user is present in the movement determination area RM but remains at the same position for a certain period of time or longer".

If the start condition is not satisfied (step S50; No), the control device 80 prohibits the start and maintains the stopped state of the autonomous driving vehicle 1. That is, the control device 80 controls the traveling device 70 so that the autonomous driving vehicle 1 does not start. Then, the processing returns to step S40 described above.

If the start condition is satisfied (step S50; Yes), the processing proceeds to step S60.

The control device 80 permits the start of the autonomous driving vehicle 1 (step S60). The control device 80 controls the traveling device 70 so that the autonomous driving vehicle 1 can start.

The control device 80 controls the traveling device 70 so that the autonomous driving vehicle 1 will start traveling according to the travel plan (step S70).

The alighting action detection processing (step S20) described above is not indispensable and may be omitted. However, the accuracy of the alighted user detection processing (step S30) is improved if the alighted user is detected in conjunction with the alighting action.

In this embodiment, the autonomous driving vehicle 1 will not start unconditionally after the user gets out of the autonomous driving vehicle 1, as described above. To reduce contact with the alighted user, the start condition that takes into consideration the position and movement of the alighted user is applied to the start of the autonomous driving vehicle 1. Until the start condition is satisfied, the start is prohibited and the autonomous driving vehicle 1 maintains the stopped state. When the start condition is satisfied, the start of the autonomous driving vehicle 1 is permitted. Controlling the start of an autonomous driving vehicle in this way improves the safety of an alighted user.

What is claimed is:

1. An autonomous driving vehicle that provides a driverless transportation service to a user, the autonomous driving vehicle comprising
    a surrounding environment sensor configured to: monitor an environment around the autonomous driving vehicle, detect the user who got out of the autonomous driving vehicle after the autonomous driving vehicle stopped at a destination as an alighted user, and monitor the alighted user; and
    an electronic control unit (ECU) programmed to:
    confirm that the autonomous driving vehicle is in a stopped state;
    maintain the stopped state of the autonomous driving vehicle based upon: (i) the alighted user is detected, (ii) the alighted user is present in a movement determination area around the autonomous driving vehicle and
    (iii) the alighted user does not remain in a same position within the movement determination area for a certain period time or longer;
    permit a start of the autonomous driving vehicle when a start condition is satisfied,
    the start condition being a condition indicating that the alighted user is present in the movement determination area around the autonomous driving vehicle but remains at the same position for the certain period of time or longer, and
    control the autonomous driving vehicle to start traveling according to a travel plan when the start of the autonomous driving vehicle is permitted.

2. The autonomous driving vehicle according to claim 1, wherein
    when the surrounding environment sensor detects a new target in an alighting determination area adjacent to the autonomous driving vehicle after the autonomous driving vehicle stopped at the destination, the surrounding environment sensor is configured to recognize the new target as the alighted user and is configured to monitor the new target as the alighted user.

3. The autonomous driving vehicle according to claim 2, wherein
    the surrounding environment sensor is configured to detect at least one of an alighting action and information suggesting the alighting action and is configured to recognize the new target that is detected in conjunction with the alighting action as the alighted user, and
    the alighting action is an action of the user when the user gets out of the autonomous driving vehicle.

4. A control method for an autonomous driving vehicle, the autonomous driving vehicle including a surrounding environment sensor and an electronic control unit (ECU), the control method comprising:
    detecting, by the surrounding environment sensor, a user who got out of the autonomous driving vehicle after the autonomous driving vehicle stopped at a destination as an alighted user;
    monitoring, by the surrounding environment sensor, the alighted user;
    maintaining, by the ECU, a stopped state of the autonomous driving vehicle after (i) the alighted user is detected and (ii) the alighted user is present in a movement determination area around the autonomous driving vehicle and (iii) the alighted user does not remain in a same position within the movement determination area for a certain period of time or longer;
    permitting, by the ECU, a start of the autonomous driving vehicle when a start condition is satisfied,
    the start condition being a condition indicating that the alighted user is present in the movement determination area around the autonomous driving vehicle but remains at the same position for the certain period of time or longer; and
    controlling, by the ECU, the autonomous driving vehicle to start traveling according to a travel plan when the start of the autonomous driving vehicle is permitted.

5. An autonomous driving vehicle that provides a driverless transportation service to a user, the autonomous driving vehicle comprising:
    a surrounding environment sensor configured to: monitor an environment around the autonomous driving vehicle, detect the user who got out of the autonomous driving vehicle after the autonomous driving vehicle stopped at a destination as an alighted user, and monitor the alighted user; and an electronic control unit (ECU) programmed to:
confirm that the autonomous driving vehicle is in a stopped state;
detect the alighted user,
monitor the alighted user to determine whether the alighted user is present in a movement determination area around the autonomous driving vehicle;
maintain the stopped state of the autonomous driving vehicle based upon (i) the alighted user moving in the movement determination area for any duration of time, or (ii) the alighted user does not remain at a same position in the movement determination area for a certain period of time or longer;
permit a start of the autonomous driving vehicle when the alighted user is present in the movement determination area around the autonomous driving vehicle but remains at the same position for the certain period of time or longer, and
control the autonomous driving vehicle to start traveling according to a travel plan when the start of the autonomous driving vehicle is permitted.

* * * * *